United States Patent

Zajchowski et al.

[11] Patent Number: 5,879,753
[45] Date of Patent: Mar. 9, 1999

[54] THERMAL SPRAY COATING PROCESS FOR ROTOR BLADE TIPS USING A ROTATABLE HOLDING FIXTURE

[75] Inventors: Paul H. Zajchowski, Enfield; Alfonso Diaz, Vernon; Melvin Freling, West Hartford; John F. Lally, Amston, all of Conn.

[73] Assignee: United Technologies Corporation, Hartford, Conn.

[21] Appl. No.: 994,660

[22] Filed: Dec. 19, 1997

[51] Int. Cl.[6] .................................. C23C 4/10; C23C 4/12
[52] U.S. Cl. ........................... 427/454; 427/446; 427/456
[58] Field of Search .................................. 427/446, 454, 427/456

[56] References Cited

U.S. PATENT DOCUMENTS

| | | | |
|---|---|---|---|
| 3,145,287 | 8/1964 | Siebein et al. | 219/75 |
| 3,851,140 | 11/1974 | Coucher | 219/121 P |
| 3,912,235 | 10/1975 | Janssen | 259/4 |
| 3,914,573 | 10/1975 | Muehlberger | 219/76 |
| 4,082,870 | 4/1978 | Yenni | 427/425 |
| 4,235,943 | 11/1980 | McComas et al. | 427/34 |
| 4,236,059 | 11/1980 | McComas et al. | 219/121 P |
| 4,256,779 | 3/1981 | Sokol et al. | 427/34 |
| 4,596,718 | 6/1986 | Gruner | 427/425 |
| 4,664,973 | 5/1987 | Otfinoski et al. | 428/307.3 |
| 4,696,855 | 9/1987 | Petitt, Jr. et al. | 428/312.8 |
| 4,735,656 | 4/1988 | Schaefer et al. | 75/238 |
| 4,851,188 | 7/1989 | Schaefer et al. | 419/19 |
| 4,861,618 | 8/1989 | Vine et al. | 427/34 |
| 5,073,433 | 12/1991 | Taylor | 428/134 |
| 5,520,516 | 5/1996 | Taylor et al. | 416/241 B |
| 5,536,022 | 7/1996 | Sileo et al. | 277/235 A |
| 5,551,840 | 9/1996 | Benoit et al. | 416/241 B |
| 5,603,603 | 2/1997 | Benoit et al. | 415/173.4 |
| 5,702,574 | 12/1997 | Foster et al. | 204/224 R |

FOREIGN PATENT DOCUMENTS

0705911A1  4/1996  European Pat. Off. .

OTHER PUBLICATIONS

Proceedings of the International Thermal Spray Conference & Exposition, Orlando, Florida, 28 May –5 Jun., "Advanced Thermal Barrier Coatings Involving Efficient Vertical Micro–Cracks", H. Nakahira et al, Kobe, Japan and T. Yogoro et al, Tokyo, Japan, pp. 519–524 (1992).

Primary Examiner—Katherine A. Bareford
Attorney, Agent, or Firm—Monica G. Krasinski

[57] ABSTRACT

A process for controllably applying thermal spray coating onto substrates is described. The process includes positioning rotor blades in a fixture rotatable about an axis, forming a spray of particles of softened coating medium in an apparatus for propelling the coating medium towards the blade tips and coating the blade tips by passing the blades through the spray of particles of coating medium. Various process details, including process parameters, are developed.

18 Claims, 2 Drawing Sheets

FIG.1

```
START
  ↓
POSITIONING THE BLADES
IN ROTATABLE FIXTURE
(EXPOSE ONLY BLADE TIPS)
  ↓
PROPELLING A SPRAY OF
SOFTENED BOND COATING
MEDIUM AT BLADES
  ↓
PASSING BLADES THROUGH
THE SPRAY OF BOND COATING
MEDIUM BY ROTATING FIXTURE
  ↓
PROPELLING A SPRAY OF TOP
COATING MEDIUM AT BLADES
  ↓
PASSING BLADES THROUGH THE
SPRAY OF TOP COATING MEDIUM
BY ROTATING FIXTURE
  ↓
REMOVE BLADES
FROM FIXTURE
  ↓
END
```

THERMAL SPRAY COATING PROCESS FOR ROTOR BLADE TIPS USING A ROTATABLE HOLDING FIXTURE

CROSS REFERENCE TO RELATED APPLICATIONS

This application relates to the following copending U.S. applications filed on even date herewith and commonly assigned to the assignee of the subject application: U.S. Application Number EH-10120, U.S. Ser. No. 08/994,926, filed Dec. 19,1997, entitled "Thermal Coating Composition", by Freling et al; U.S. Application Number EH-10095, U.S. Ser. No. 08/994,680, filed Dec. 19, 1997, entitled "Tooling Assembly for Positioning Airfoils of a Rotary Machine", by Zajchowski and Diaz; U.S. Application Number EH-10117, U.S. Ser. No. 08/994,676, filed Dec. 19, 1997, entitled "Shield and Method for Protecting an Airfoil Surface", by Zajchowski and Diaz; and U.S. Application Number EH-10118, U.S. Ser. No. 08/994,662, filed Dec. 19, 1997, entitled "Method for Applying a Coating to the Tip of a Flow Directing Assembly", by Zajchowski and Diaz.

TECHNICAL FIELD

This invention relates to a process for controllably applying thermal spray coating onto substrates and more particularly, to applying a plurality of coating layers onto gas turbine engine rotor blade tips.

BACKGROUND ART

Large gas turbine engines are widely used for aircraft propulsion and for ground based power generation. Such large gas turbine engines are of the axial type, and include a compressor section, a combustor section, and a turbine section, with the compressor section normally preceded by a fan section. An annular flow path for working medium gases extends axially through the sections of the engine. Each of the fan, compressor, and turbine sections comprises a plurality of disks mounted on a shaft, with a plurality of airfoil shaped blades projecting radially from the disks. A hollow case surrounds the various engine sections. A plurality of stationary vanes are located between the disks and project inwardly from the case assembly which surrounds the disks.

During operation of the fan, compressor, and turbine sections, as the working medium gases are flowed axially, they alternately contact moving blades and the stationary vanes. In the fan and compressor sections, air is compressed and the compressed air is combined with fuel and burned in the combustion section to provide high pressure, high temperature gases. The working medium gases then flow through the turbine section, where energy is extracted by causing the bladed turbine disks to rotate. A portion of this energy is used to operate the compressor section and the fan section.

Engine efficiency depends to a significant extent upon minimizing leakage of the gas flow to maximize interaction between the gas stream and the moving and stationary airfoils. A major source of inefficiency is leakage of gas around the tips of the compressor blades, between the blade tips and, the engine case. Accordingly, means to improve efficiency by reduction of leakage are increasingly important. Although a close tolerance fit may be obtained by fabricating the blade tips and the engine case to mate to a very close tolerance range, this fabrication process is extremely costly and time consuming. Further, when the assembly formed by mating the blade tips and the engine case is exposed to a high temperature environment and rotational forces, as when in use, the coefficients of expansion of the blade tips and the engine case parts may differ, thus causing the clearance space to either increase or decrease. A significant decrease in clearance results in contact between blades and housing, and friction between the parts generates heat causing a significant elevation of temperatures and possible damage to one or both members. On the other hand, increased clearance space would permit gas to escape between the compressor blade and housing, thus decreasing efficiency.

One approach to increase efficiency is to apply an abradable coating of suitable material to the interior surface of the compressor housing, which when abraded allows for the creation of a channel between the blade tips and the housing. Leakage between the blade tips and the housing is limited to airflow in the channel. Various coating techniques have been employed to coat the inside diameter of the compressor housing with an abradable coating that can be worn away by the frictional contact of the compressor blade, to provide a close fitting channel in which the blade tip may travel. Thus, when subjecting the coated assembly to a high temperature and stress environment, the blade and the case may expand or contract without resulting in significant gas leakage between the blade tip and the housing.

However, it is critical that the blade tips not degrade when contacted with the coatings applied to the interior surface of the compressor housing. To increase the durability of the blade tips which rub against the abradable seals, abrasive layers are sometimes applied to the blade tip surface by a variety of methods. See, for example, U.S. Pat. No. 4,802,828, of Rutz et al, which suggests several techniques for providing an abrasive layer on a blade tip, including powder metallurgy techniques, plasma spray techniques, and electroplating techniques; Schaefer et al, U.S. Pat. No. 4,735,656, which teaches application of an abrasive comprising ceramic particulates in a metal matrix by controlled melting and solidification of the matrix metal; or, Schaefer et al, U.S. Pat. No. 4,851,188, which teaches a sintering operation for application of an abrasive layer to the tip of a superalloy gas turbine blade.

Plasma spraying devices and techniques are well known in the art for depositing protective coatings on underlying substrates. One known device is illustrated in U.S. Pat. No. 3,145,287 to Siebein et al entitled "Plasma Flame Generator and Spray Gun ". In accordance with the teaching of the Siebein et al patent, a plasma-forming gas forms a sheath around an electric arc. The sheath of gases constricts and extends the arc part way down the nozzle. The gas is converted to a plasma state and leaves the arc and nozzle as a hot plasma stream. Powders are injected into the hot plasma stream and propelled onto the surface of the substrate to be coated.

U.S. Pat. Nos. 3,851,140 to Coucher entitled "Plasma Spray Gun and Method for Applying Coatings on a Substrate" and 3,914,573 to Muehlberger entitled "Coating Heat Softened Particles by Projection in a Plasma Stream of Mach 1 to Mach 3 Velocity" disclose contemporaneous coating technology.

This above art notwithstanding, scientists and engineers working under the direction of Applicant's assignee are seeking to improve the process of applying thermal spray coating to substrates in a gas turbine engine. In particular, they have sought to improve the application time of the thermal spray coating using the plasma spraying devices, and to produce a process that is tolerant of variations in flow parameters affecting the spray coating.

DISCLOSURE OF THE INVENTION

According to the present invention, a method for controllably applying spray coating to the tips of gas turbine engine rotor blades includes positioning the rotor blades in a holding fixture rotatable about an axis, forming a spray of particles of softened coating medium in an apparatus for propelling the coating medium, and coating the tips of the rotor blades by rotating the tips of the rotor blades about the axis of rotation and passing the blades through the spray of particles of softened coating material to deposit layers of the coating on each rotor blade sequentially with each pass of the blade tip through the spray such that variations in the coating process parameters are spread over a number of blades.

In accordance with the present invention, the process includes forming a spray of particles of softened coating medium, the spray having a circumferential width at least the size of the circumferential width of the blades.

In accordance with the present invention, the process includes the step of heating the tips of the rotor blades and the fixture to an elevated temperature during coating.

In accordance with one particular embodiment of the invention, the process includes positioning the blades circumferentially in the holding fixture which is rotatable about an axis of rotation such that adjacent points on the blade tips will approximate a surface of rotation substantially parallel to the surface of rotation which the blade tips will experience in an operational engine.

In accordance with one particular embodiment of the present invention, the process includes the step of translating the apparatus for forming and propelling the spray coating, such as a spray gun, between a first and second position in a direction substantially parallel to the plane of rotation of the fixture which allows for a thin layer of thermal spray coating to be deposited on the tips of the blades each time they pass in front of the spray gun which build up to a plurality of layers, resulting in a splat structure with vertical microcracks.

A primary feature of the present invention is the relative motion between the rotating holding fixture for the blades and the apparatus for forming and propelling the coating medium. Another feature is disposing and rotating the blades in the holding fixture such that points receiving the coating on the blade tips describe a circle about the axis of rotation of the fixture. In one embodiment, the holding fixture is rotated such that adjacent points on the blade tips approximate a surface of rotation substantially parallel to the surface of rotation which the blade tips will experience in an operating engine. Another feature is the step of translating the apparatus for forming and propelling the spray coating between a first and second position. In one embodiment, the spray coating apparatus moves in a direction substantially parallel to the surface of rotation of the fixture. Another feature is heating the blades to an optimum temperature by passing the blades in front of the spray coating apparatus and through the plasma gas stream. Another feature is depositing the coating medium by passing the blades through the spray of particles of softened coating medium. Another feature is cooling the blades by moving them away from the spray gun, after an independent source of the deposition of each coating layer. Another feature is cooling the blades by directing an independent source of cooling air on the blade tips as the blades rotate away from the gun. Another feature is heating the blades using an independent source of heat before the blades re-enter the plasma gas stream. Another feature of the present invention is the use of control processing parameters to apply the plurality of coating layers. These parameters include the relative speed of the holding fixture to the apparatus for providing the coating (e.g. spray gun), distance from spray gun-to-blade tips, coating powder feed rate, plasma gas stream flow and the power of the spray gun.

A primary advantage of the present invention is the quality of coating applied to the tips of rotor blades which results from using the process to distribute among a multiplicity of the rotor blades any variations in the process flow parameters affecting the stream of particles propelled against the tips. As a result, the coating process of the present invention has less sensitivity to process variations than a process which allows variations to occur only on one blade. Another advantage is the reproducible and reliable process that results due to the use of the control parameters. This process can be used to repetitively apply the coating on substrate surfaces.

Another advantage is the ease and speed of application of the coating on the surfaces of a large number of blades at a given time which results from the size of the holding fixture and process which accommodates a number of blades. Using a holding fixture that accommodates a plurality of blades, the resultant fixturing time is minimized. Another advantage of one embodiment of the present invention is the application of coating to substrates without the use of additional heating apparatus for the substrates. During coating deposition, the optimum amount of heat required is transmitted to the substrates by the plasma gas and the molten coating powder. The rotor blade is not overheated during the coating process. As a result, a rotor blade can be coated without changing the microstructure or properties of the substrate.

The foregoing and other objects, features and advantages of the present invention will become more apparent in the light of the following detailed description of the best mode for carrying out the invention and from the accompanying drawings which illustrate an embodiment of the invention.

BEST MODE FOR CARRYING OUT THE INVENTION

Figure 2:
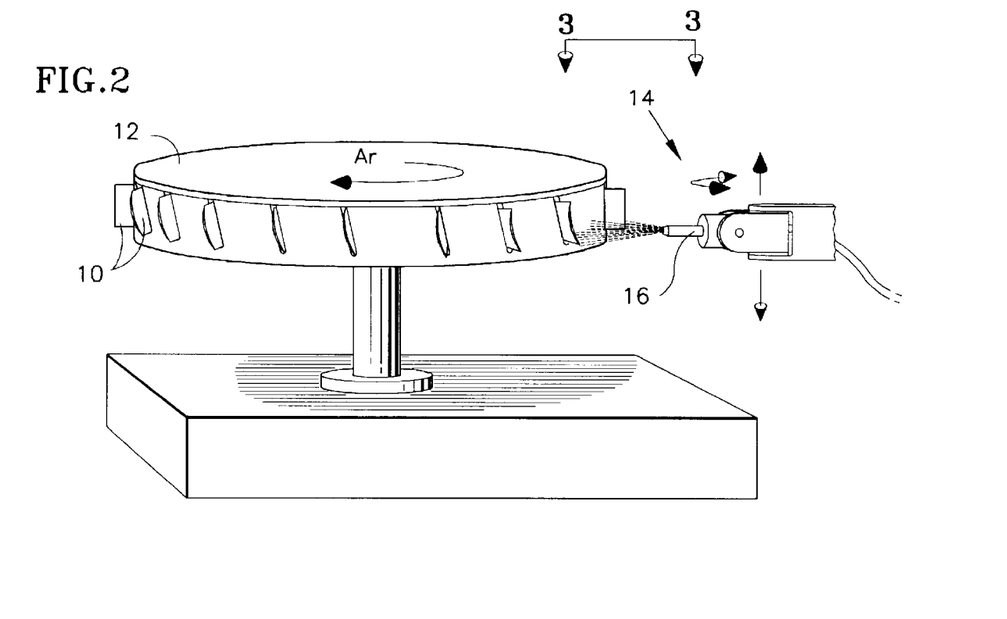
FIG. 2 is a partial perspective view, in schematic fashion, showing the relationship of the holding fixture and apparatus for propelling particles at the tips of an array of rotor blades disposed in the holding fixture, which are used in the present invention.

FIG. 2 shows a schematic representation of an apparatus for forming and propelling particles of coating medium and a holding fixture. A plurality of rotating blades such as compressor blades 10 are positioned in the cylindrical holding fixture 12. The holding fixture has an axis of rotation $A_r$. The holding fixture can accommodate a large number of blades, up to a full stage of blades. The fixture diameter ranges from about eighteen to thirty-six inches (18 to 36") (457 to 914 mm), preferably about twenty to twenty-eight inches (20 to 28") (508 to 711 mm) to approximate the size of the flowpath of the engine. The large size of the fixture can accommodate an entire stage of blades. Selecting a fixture which positions the blades at a radius from the axis of rotation A, which is the same as the operative radius ensures the location of the blade tip approximates closely the radius in the engine.

Each rotor blade has a root and a platform. An airfoil extends from the platform and terminates in a tip. Each airfoil has a leading edge and a trailing edge. A suction surface and a pressure surface extend between the edges. The blades are oriented such that points on the blade tips describe a circle about the axis of rotation of the holding fixture. The blade tips face in the outward direction from the holding fixture.

The apparatus for propelling particles toward the blade tips, as represented by a spray coating apparatus 14, is in close proximity to the holding fixture. The spray coating apparatus includes a spray gun 16 positioned at the outer diameter of the cylindrical fixture for depositing the layers. The spray gun is translatable in different directions with respect to the holding fixture. The spray coating apparatus forms a heated plasma including molten particles, such as molten zirconium oxide particles, which are propelled in the heated plasma gas stream toward the blades disposed in the fixture.

In one embodiment, the blades are positioned in the holding fixture such that adjacent points on the blade tips approximate a surface of rotation substantially parallel to the surface of rotation which the blade tip will experience while in a working engine. As the blades are rotated, the gun moves up and down in a direction substantially parallel to the plane of rotation of the fixture, coating the blades in sequence.

The thickness of the abrasive coating deposited depends on the application of the substrate. In compressor and brush seal applications, the abrasive layer may have a thickness ranging from five to forty mils (5 to 40 mils) (0.13 to 1.02 mm).

Figure 3:
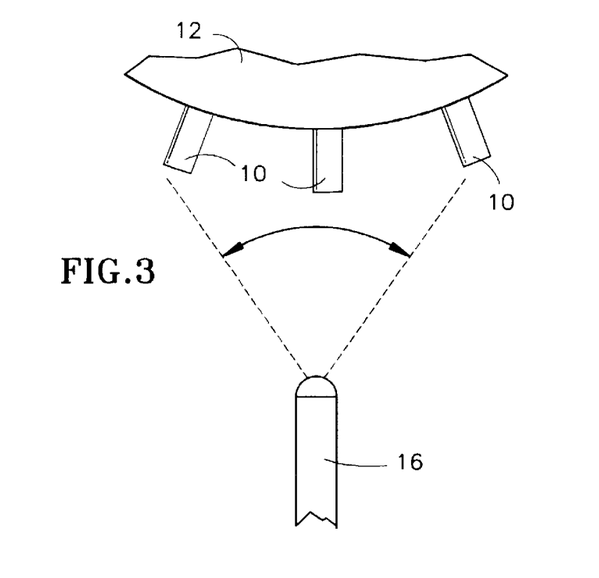
FIG. 3 is an enlarged view taken along lines 3—3 of FIG. 2 showing the relationship between the plasma spray and the tips of the array of the rotor blades.

FIG. 3 is an enlarged view taken along lines 3—3 of FIG. 2 showing the relationship between the plasma spray propelled from the apparatus for forming and propelling particles and the blade tips disposed in the holding fixture. The circumferential width of the spray can range from the size of the circumferential width of the blades to a width ten times (10×) that of the circumferential width of the blades. This enables the spray coating to be deposited uniformly onto the suction and pressure surfaces of the airfoil of the blade. The phenomenon of overspraying is known in the art, even in processes that spray coat straight onto blade tips that are stationary. However, the overspray that results from the present invention process coats more airfoil surface area and is applied uniformly as compared with prior art processes. The overspray onto the airfoil surfaces provides for better adhesion of the spray coating onto the blades. The coating is not subject to chipping at the leading and trailing edges as by overspraying and applying the coating to the leading and trailing edges of the blade and to contiguous areas of the suction and pressure surfaces, as well as to the tip itself, a more durable blade tip may be obtained.

The processing steps of the invention are controlled to produce vertical microcracking (essentially perpendicular to the bond coat surface) and are specific to variables such as gun-type and fixture geometry. The vertical microcracks may extend through a top coating layer to a bond coating layer. The vertical microcracks do not extend to the substrate surface. The processing steps include the selection of certain parameters. These parameters include rotating the fixture at a preselected speed, angling the gun with respect to the substrate, moving the gun at a preselected traverse speed, heating the substrate to a preselected temperature, injecting the coating powder at a preselected rate, and flowing the carrier gas and plasma gases at preselected flow rates. These parameters all influence the structure of the coating and as such should be adjusted to provide uniform coating of compressor blades, or other substrates. In general, it has been found that a close gun-to-substrate spray distance coupled with relatively high spray gun power results in the desired vertical segmentation or microcracking of the coating structure. The parameters described herein were tailored for use with an F-4 model air plasma spray gun purchased from Plasma Technics, Inc., now supplied by Sulzer Metco having facilities in Westbury, N.Y., and various diameter cylindrical fixtures depending on substrate configuration. As will be realized, the parameters may vary with the use of a different spray gun and/or fixture. Accordingly, the parameters set forth herein may be used as a guide for selecting other suitable parameters for different operating conditions.

Figure 1:
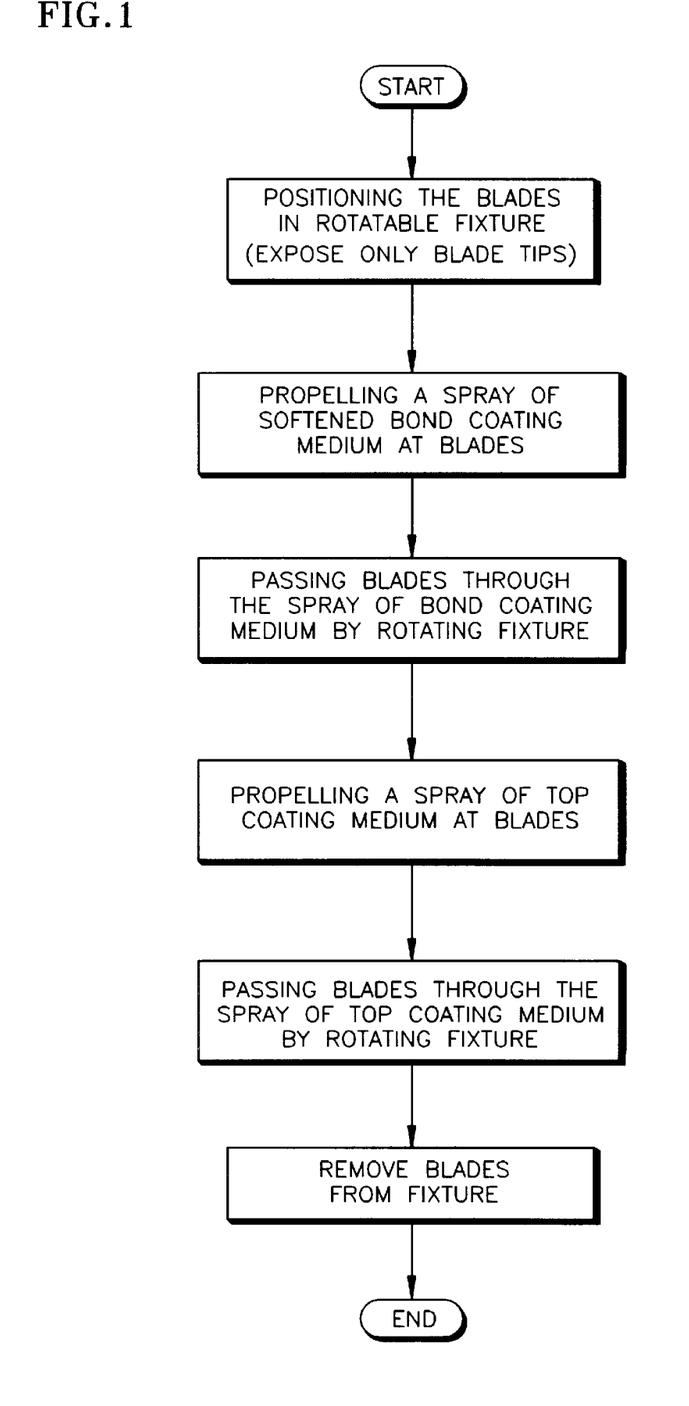
FIG. 1 is a flow chart showing the invention process.

The process for controllably applying spray coating as flow charted in FIG. 1, includes a number of interrelated steps beginning with providing blades having clean, exposed blade tips and protected airfoil and root surfaces typically provided by masking. Conventional cleaning and preparation of the blade tip prior to application of the abrasive layer should be conducted. In the practice of the present invention, for example with a blade tip as shown in the figures, the surface of the blade tip is cleaned and roughened to enhance adherence of subsequently applied coating materials. Such cleaning can include mechanical abrasion such as through a vapor or air blast type process employing dry or liquid carried abrasive particles impacting the surface.

Prior to cleaning the surface, blades are suitably masked as shown in U.S. Application Number EH-10117, U.S. Ser. No. 08/994,676, filed Dec. 19, 1997, entitled "Shield and Method for Protecting an Airfoil Surface", by Zajchowski and Diaz, herein incorporated by reference.

The process includes propelling a spray of particles of softened bond coating medium toward the blade tips. The step of propelling the coating medium includes the step of forming a spray of particles of softened bond coating medium in the spray coating apparatus. This step includes flowing bond coat powder and carrier gases into a high-temperature plasma gas stream. In the plasma gas stream, the powder particles are melted and accelerated toward the substrate. Generally, the powder feed rate should be adjusted to provide adequate consistency and amount of bond coating. The bond coat powder feed rate ranges from thirty to fifty-five grams per minute (30 to 55 grams/min). Carrier gas flow (argon gas) is used to maintain the powder under pressure and facilitate powder feed. The carrier gas flow rate ranges from four to eight standard cubic feet per hour (4 to 8 scfh) (1.9 to 3.8 standard liters per minute (SLM)). Standard conditions are herein defined as about room temperature (77° F.) and about one atmosphere of pressure (760 mmHg) (101 kPa).

The gases that make up the plasma gas stream comprise of a primary gas (argon gas) and a secondary gas (hydrogen gas). Helium gas may also be used as a secondary gas. The primary gas flow rate in the gun ranges from seventy-five to one hundred and fifteen standard cubic feet per hour (75 to 115 scfh) (35 to 54 SLM), while the secondary gas flow rate ranges from ten to twenty-five standard cubic feet per hour (10 to 25 scfh) (4.7 to 12 SLM). Spray gun power generally ranges from thirty to fifty kilowatts (30 to 50 KW).

The process then includes the step of translating the spray of softened bond coating medium at a distance ranging between about four to six inches (4 to 6") (102 to 152 mm) from the blade tips, between a first and second position. In one embodiment, the spray gun is moved in a direction substantially parallel to the surface of rotation of the holding fixture. Spray gun traverse speed during bond coat deposition ranges from six to twelve inches per minute (6 to 12 in/min) (152 to 305 mm/min).

Further, the process includes passing the blades through the spray of particles of softened bond coating medium by rotating the fixture about its axis of rotation. This step includes heating the blades to a temperature of two hundred to four hundred and fifty degrees Fahrenheit (200° to 450° F.) by passing the blades in front of the spray gun and hot plasma gas stream. The step of passing the blades through the spray of particles of softened bond coating medium also includes cooling the blades and the coating layer deposited by rotating them away from the spray gun. Additional cooling of the blades can be provided by directing a cooling air stream or cooling jet on the blades or the fixture. Independent sources of heating can also be provided to heat the blades prior to the blades entering the spray of particles of coating medium. The independent heating source would allow for control of blade temperature without adjusting the spray gun to provide heating. Specifically, during bond coat deposition, the cylindrical fixture rotates at a speed which ranges from twenty to seventy-five revolutions per minute (20 to 75 rpm), depending on substrate diameter. The surface speed of the blades ranges typically from one hundred and twenty-five to three hundred surface feet per minute (125 to 300 sfpm).

The coating process then includes the step of forming a spray of particles of softened top coating medium. This step includes flowing top coat powder and carrier gases into the high-temperature plasma gas stream. Generally, the powder feed rate should be adjusted to provide adequate mix to cover the substrate, yet not be so great as to reduce melting and crack formation. Top coat powder feed rate ranges from fifteen to forty grams per minute (15 to 40 grams/min). Carrier gas flow (argon gas) is used to maintain the powder under pressure and facilitate powder feed. The flow rate ranges from four to eight standard cubic feet per hour (4 to 8 scfh) (1.9 to 3.8 SLM). As described hereinabove, standard conditions are herein defined as about room temperature (77° F.) and about one atmosphere of pressure (760 mmHg) (101 kPa).

The step of forming a spray of particles of softened top coating medium includes the injection of the top coat powder angled such that it imparts a component of velocity to the powder which is opposite to the direction of flow of the plasma toward the rotating fixture. The projection of the injection angle in a plane perpendicular to the axis of rotation of the holding fixture lies in a range from sixty-five to eighty-five degrees (65° to 85°). This injection angle serves to introduce the top coat powder further back into the plasma plume, thus increasing the residence time of the powder in the plasma gas stream. The increased residence time in the plasma gas stream provides for better melting of the powder particles.

Primary gas flow (argon gas) in the gun ranges from fifty to ninety standard cubic feet per hour (50 to 90 scfh) (24 to 43 SLM). Similarly, secondary gas flow (hydrogen gas) in the gun ranges from ten to thirty scfh (10 to 30 scfh) (4.7 to 14 SLM). Spray gun power generally ranges from thirty to fifty kilowatts (30 to 50 KW).

The process further includes the step of translating a spray of softened top coating medium at a distance ranging from three to four inches (3 to 4") (76 to 102 mm) from the blade tips, between a first and second position in a direction substantially normal to the plane of rotation of the holding fixture. Spray gun traverse speed across each part during deposition ranges from two to ten inches per minute (2 to 10 in/min) (50.8 to 254 mm/min). The gun-to-substrate distance may be varied with the intent of maintaining the appropriate temperature level at the substrate surface. A close gun-to-substrate distance is necessary for satisfactory vertical microcracking.

The process further includes the step of passing blades through the spray of particles of softened top coating medium by rotating the fixture about its axis of rotation, wherein the step includes heating the blades by passing the blades in front of the spray gun. The temperature of top coat application is the temperature measured at the substrate at the time of applying the top coating. The temperature of application may vary from three hundred to eight hundred and fifty degrees Fahrenheit (300° F. to 850° F.). The actual temperature of application is preferably maintained at a relatively constant level varying from about ± five to ten percent (±5% to 10%) of a predetermined temperature, depending upon the size of engine element coated, and the substrate on which the top coating is sprayed.

The step of passing the blades through the spray of softened particles includes the step of cooling the blades. Additionally, external cooling may be used to control deposition temperature.

This process results in layers of bond and top coating being sequentially deposited onto the blade tips in a surface of rotation substantially parallel to the surface of rotation which the blades describe when rotating in operating conditions. While the phenomenon is not well understood, it is believed that by depositing coating layers one at a time in an orientation substantially parallel to the surface of rotation that the coating layers will experience in an operating engine, the process confers an advantage as it provides relatively uniform microcracking of the coating in a radial direction. This results in relatively uniform stresses in the coating structure during operative conditions.

The bond coating medium provides as oxidation resistant coating. Typically the bond coating material is a nickel-aluminum alloy. However, the bond coating medium may alternatively comprise of McrAIY or other oxidation resistive material.

The top coating medium used consists essentially of from eleven to fourteen weight percent (11 to 14 wt. %) of yttria and the balance primarily being zirconia. This top coating composition with a high yttria content provides improved resistance to corrosion, as well as better temperature stability of the top coating ceramic material. The improved stability of the top coating material decreases the likelihood of spalling of the material. Thus, the substrate material remains protected from the corrosive effects of the sulfides and salts from the ambient environmental conditions.

Further, the high yttria content of the top coating material provides for a material having a lower thermal conductivity as compared with material prepared with lower yttria content. The thermal conductivity for the eleven to fourteen weight percent (11 to 14 wt. %) yttria is approximately one point one five watts per meter Kelvin (1.15 watts/meter-k) as compared to a thermal conductivity of one point four watts per meter Kelvin (1.4 watts/meter-k) for a coating consisting of seven to nine weight percent (7 to 9 wt. %) of yttria. The lower thermal conductivity of the coating provides an advantage during rub events in an operational engine when the blade tips make contact with the inner surface of the engine case. The rub generates a step input of frictional heat in the contracting surface. This heat has to be removed. The lower thermal conductivity of the blade tip coating, comprising eleven to fourteen weight percent yttria, provides for heat transfer from the blade tip via convention and radiation. The process of conduction is not used for heat removal. Thus, it is believed that lower thermal conductivity would result in a lower substrate temperature as the coating does not conduct heat down to the bond coat and therefore to the substrate as compared with substrates coated with compositions containing a lower weight percent of yttria. The properties of the base metal substrate, thus are unaffected by heat as in the case of compressor blade tips, and thus retains the coating better in service.

A primary advantage of the present invention is the quality of coating applied to the tips of rotor blades which results from using the process to distribute among a multiplicity of the rotor blades any variations in the process flow parameters affecting the stream of particles propelled against the tips. Due to the rotating fixture, a number of blades pass through the spray of softened coating medium. Any variations in the flow parameters such as variations in spray intensity, temperature, composition and feed of powders to the spray are distributed over a number of blades that pass through the spray during the period of variation. This ensures that one rotor blade tip does not receive all of the variations in coating. As a result, the coating process of the present invention provides for a more uniform coating and has less sensitivity to process variations than a process using a stationary fixture in which all variations are deposited only on a single blade. Further, the coating is applied in layers that are approximately parallel to the location of that part of the tip of the rotor blade about the axis. By selecting a fixture which positions the tips at a radius from the axis of rotation $A_R$ which is the same as the operative radius ensures the location of the tip approximates closely the radius in the engine. As a result, the coating is substantially parallel to the axis of rotation of the fixture and the coating layer follows approximately the surface of rotation which the coating layer will experience during operation of the engine. It is believed the orientation of the coating will enhance performance of the coating.

Another advantage is the reproducible and reliable process that results due to the use of the control parameters. This process can be used to repetitively apply bond coating onto substrate surfaces or top coating onto bond coating layers.

Another advantage is the ease and speed of application of the coating on the surfaces of a large number of blades at a given time which results from the size of the holding fixture and process which accommodates a multiplicity of blades. Using a holding fixture that accommodates a number of blades, the resultant fixturing time is minimized. In certain embodiments, an entire stage of blades can be coated.

Another advantage of the present invention is the application of coating to substrates without the use of additional heating apparatus for the substrates. During coating deposition, the optimum amount of heat required is transmitted to the substrates through the plasma gas and the molten coating powder. The rotor blade is not overheated during the coating process. As a result, a rotor blade can be coated without changing the substrate microstructure or properties.

In the following examples, the best mode practices, just described, are generally followed. An F-4 model air spray gun purchased from Plasma Technics, Inc., now supplied by Sulzer Metco, having facilities in Westbury, N.Y., is used for all the following examples.

EXAMPLE I

In this practice of the invention, small nickel rotor blades are positioned in a holding fixture measuring twenty-four inches (24") (610 mm) in diameter.

For the bond coat application, the spray gun is powered to about thirty-five kilowatts (35 KW). The bond coat powder feed rate is forty-five grams per minute (45 gms/min). The primary gas (argon) flow rate is ninety-five scfh (95 scfh) (45 SLM) and secondary gas (hydrogen) flow rate is eighteen scfh (18 scfh) (8.5 SLM). The spray gun is positioned five and one-half inches (5.5") (140 mm) away from the blade tip surfaces. The holding fixture rotation speed is forty revolutions per minute (40 rpm) while the spray gun traverse rate is nine inches per minute (9"/min) (229 mm/min).

For the top coat application, the plasma spray gun is powered to about forty-four kilowatts (44 KW). The top coat powder feed rate is twenty-two grams per minute (22 gms/min). The primary gas (argon) flow rate is sixty-seven scfh (67 scfh) (32 SLM) and secondary gas (hydrogen) flow rate is twenty-four scfh (24 scfh) (11 SLM). The spray gun is positioned three and one-quarter inches (3.25") (83 mm) away from the blade tip surfaces. The holding fixture rotation speed is thirty revolutions per minute (30 rpm), while the spray gun traverse rate is six inches per minute (6"/min) (152 mm/min). The blade temperature during top coat application is six hundred plus/minus twenty-five degrees Fahrenheit (600°±25° F.).

The bond coat composition is ninety-five weight percent nickel (95 wt. %) and five weight percent aluminum (5 wt. %). This composition results in an adherent bond coat on the blade tips.

The top coat composition is twelve weight percent yttria (12 wt. %) and the balance essentially being zirconia. The process and the composition of the coatings results in a desired splat structure having vertical microcracks being deposited on the blade tips. The vertical microcracks extend through the top coating layer to the bond coating layer.

EXAMPLE II

In this practice of the invention, titanium rotor blades, twice the size of the blades used in Example I, are positioned in a holding fixture measuring twenty-four inches (24") (610 mm) in diameter.

For the bond coat application, the spray gun is powered to about thirty-four kilowatts (34 KW). The bond coat powder feed rate is forty-five grams per minute (45 gms/min). The primary gas (argon) flow rate is ninety-five scfh (95 scfh) (45 SLM) and secondary gas (hydrogen) flow rate is eighteen scfh (18 scfh) (8.5 SLM). The spray gun is positioned five and one-half inches (5.5") (140 mm) away from the blade tip surfaces. The holding fixture rotation speed is forty revolutions per minute (40 rpm), while the spray gun traverse rate is nine inches per minute (9"/min) (229 mm/min).

For the top coat application, the plasma spray gun is powered to about forty-four kilowatts (44 KW). The top coat powder feed rate is twenty-two grams per minute (22 gms/min). The primary gas (argon) flow rate is sixty-seven scfh (67 scfh) (32 SLM) and secondary gas (hydrogen) flow rate is twenty-four scfh (24 scfh) (11 SLM). The spray gun is positioned three and one-quarter inches (3.25") (83 mm)

away from the blade tip surfaces. The holding fixture rotation speed is thirty revolutions per minute (30 rpm), while the spray gun traverse rate is six inches per minute (6"/min) (152 mm/min). The blade temperature during top coat application is four hundred and twenty-five plus/minus twenty-five degrees Fahrenheit (425°±25° F.).

The bond coat composition is ninety-five weight percent nickel (95 wt. %) and five weight percent aluminum (5 wt. %). This composition results in an adherent bond coat on the blade tips.

The top coat composition is twelve weight percent yttria (12 wt. %) and the balance essentially being zirconia. The process and the composition of the coatings results in a desired splat structure having vertical microcracks being deposited on the blade tips. The vertical microcracks extend through the top coating layer to the bond coating layer.

EXAMPLE III

In this practice of the invention, large titanium rotor blades, three times the size of the blades used in Example I, are positioned in a holding fixture measuring thirty-four inches (34") (864 mm) in diameter.

For the bond coat application, the spray gun is powered to about thirty-five kilowatts (35 KW). The bond coat powder feed rate is forty-five grams per minute (45 gms/min). The primary gas (argon) flow rate is ninety-five scfh (95 scfh) (45 SLM) and secondary gas (hydrogen) flow rate is eighteen scfh (18 scfh) (8.5 SLM). The spray gun is positioned five and one-half inches (5.5") (140 mm) away from the blade tip surfaces. The holding fixture rotation speed is thirty-two revolutions per minute (32 rpm), while the spray gun traverse rate is nine inches per minute (9"/min) (229 mm/min).

For the top coat application, the plasma spray gun is powered to about forty-four kilowatts (44 KW). The top coat powder feed rate is twenty-two grams per minute (22 gms/min). The primary gas (argon) flow rate is sixty-seven scfh (67 scfh) (32 SLM) and secondary gas (hydrogen) flow rate is twenty-four scfh (24 scfh) (11 SLM). The spray gun is positioned three and one-quarter inches (3.25") (83 mm) away from the blade tip surfaces. The holding fixture rotation speed is twenty-two revolutions per minute (22 rpm), while the spray gun traverse rate is two inches per minute (2"/min) (51 mm/min). The blade temperature during top coat application is three hundred and twenty-five plus/minus twenty-five degrees Fahrenheit (325°±25° F.).

The bond coat composition is ninety-five weight percent nickel (95 wt. %) and five weight percent aluminum (5 wt. %). This composition results in an adherent bond coat on the blade tips.

The top coat composition is twelve weight percent yttria (12 wt. %) and the balance essentially being zirconia. The process and the composition of the coatings results in a desired splat structure having vertical microcracks being deposited on the blade tips. The vertical microcracks extend through the top coating layer to the bond coating layer.

Although the invention has been shown and described with respect to detailed embodiments thereof, it should be understood by those skilled in the art that various changes in form and detail thereof may be made without departing from the spirit and the scope of the claimed invention.

What is claimed is:

1. A process for applying thermal coating to the tips of gas turbine engine rotor blades having a tip, an airfoil and a root, the airfoil disposed between the root and the tip and having a leading edge, a trailing edge, a suction surface and a pressure surface, which extend between the edges, said blades having a circumferential width, the process comprising the steps of:
    a) positioning the blades with exposed, clean tips, circumferentially in a rotatable holding fixture having an axis of rotation, wherein the blades are positioned radially with respect to the axis of rotation of the fixture such that each airfoil extends substantially radially outwardly with respect to the axis of rotation with the blade tips facing outwardly away from the axis of rotation and the blade roots facing inwardly toward the axis of rotation;
    b) propelling a spray of particles of softened coating medium which includes the step of
        forming a spray of particles, said spray having a circumferential width at least the size of the circumferential width of the blades;
    c) passing the blades through the spray of particles of softened coating material by rotating the holding fixture continuously about the axis of rotation
    wherein layers of coating medium are sequentially deposited on the blade tips and variations in the deposited coating are spread out over a number of blades to result in a uniform, stable coating in operative conditions.

2. The process of claim 1, wherein the step of forming a spray of particles, the circumferential width of the spray ranges from the size of the circumferential width of the blades to ten times (10x) the size of the circumferential width of the blades.

3. The process of claim 1, wherein the step of propelling a spray of particles of softened coating material includes the step of directing the spray of particles of softened coating medium at the blade tips.

4. The process of claim 1, wherein the process is used to apply a bond coating to the tips of gas turbine engine rotor blades and wherein the process includes the step of forming a spray of particles of softened bond coating medium.

5. The process of claim 1, wherein the process is used to apply a top coating to the tips of gas turbine engine rotor blades and wherein the process includes the step of forming a spray of particles of softened top coating medium.

6. A process for applying thermal coating to the tips of gas turbine engines rotor blades having a tip, an airfoil and a root, the airfoil having a leading edge, a trailing edge, a suction surface and a pressure surface which extend between the edges, said blades having a circumferential width, the process comprising the steps of:
    a) positioning the blades with exposed, clean tips, circumferentially in a rotatable holding fixture wherein points receiving the coating medium on each blade tip following a circle having a center at the axis of rotation of the fixture;
    b) propelling a spray of particles of softened bond coating medium at the blade tips which includes the steps of
        forming a spray of particles of softened bond coating medium having a circumferential width, wherein the step includes flowing bond coat powder and carrier gases into a plasma gas stream; and
        directing the spray of softened bond coating medium at a distance of from four to six inches (4 to 6") from the blade tips;
    c) passing the blades through the spray of particles of softened bond coating medium by rotating the holding fixture about an axis of rotation at a speed of from twenty to seventy-five revolutions per minute (20 to 75 rpm), wherein the step includes cooling the blades;

d) propelling a spray of particles of softened top coating medium at the blade tips which includes the steps of
   forming a spray of particles of softened top coating medium having a circumferential width, wherein the step includes flowing top coat powder and carrier gases into the plasma gas stream; and
   directing the spray of softened top coating medium at a distance of from three to four inches (3 to 4") from the blade tips; and
e) passing blades through the spray of particles of softened top coating medium by rotating the holding fixture about an axis of rotation, wherein the step includes cooling the blades;

wherein layers of bond and top coating are sequentially deposited such that adjacent points on the blade tips approximate a surface of rotation substantially parallel to the surface of rotation which the blade tip will experience while in a working engine and any variations in the parameters of the deposited coating are spread over a number of blades to result in a uniform, stable coating in operative conditions.

7. A process of claim 6, wherein in the step of forming a spray of particles of at least one of said softened coating mediums, the circumferential width of the spray is from one to ten times the size of the circumferential width of the blades.

8. A process of claim 6, wherein the step of directing the spray of at least one of said softened coating mediums includes translating the spray of softened coating medium between a first and second position.

9. The process of claim 6, wherein the steps of forming particles of at least one of said softened coating mediums includes heating a plasma spray gun to a power of from thirty to fifty kilowatts (30 to 50 KW).

10. The process of claim 6, wherein the step of forming the softened bond coating medium includes generating a plasma gas stream by heating a primary plasma gas having a gas flow rate of from seventy-five to one hundred and fifteen standard cubic feet per hour (75 to 115 scfh) and a secondary plasma gas having a gas flow rate of from ten to twenty-five standard cubic feet per hour (10 to 25 scfh) and flowing carrier gases carrying bond coat powder having a powder feed rate of from thirty to fifty-five grams per minute (30 to 55 gms/min) into the plasma gas stream.

11. The process of claim 8, wherein the step of translating a spray of softened bond coating medium occurs at a rate of from six to twelve inches per minute (6 to 12"/min).

12. The process of claim 6, wherein the step of passing the blades through the spray of particles of softened bond coating includes heating the blade tips to a temperature of from two hundred to four hundred and fifty degrees Fahrenheit (200° to 450° F.).

13. The process of claim 6, wherein the step of forming the softened top coating medium includes generating a plasma gas stream by heating a primary plasma gas having a gas flow rate of from fifty to ninety standard cubic feet per hour (50 to 90 scfh) and a secondary plasma gas having a gas flow rate of from ten to thirty standard cubic feet per hour (10 to 30 scfh) and flowing carrier gases carrying top coat powder having a powder feed rate of from fifteen to forty grams per minute (15–40 gms/min) into the plasma gas stream.

14. The process of claim 13, wherein the step of forming the softened top coating medium includes the step of injecting the top coat powder into the plasma gas stream which further includes angling the injection such that it imparts a component of velocity to the powder which is opposite to the direction of flow of the plasma gas stream toward the rotating fixture, the projection of the injection angle in a plane perpendicular to the axis of rotation of the holding fixture lies in a range from sixty five to eighty-five degrees (65° to 85°), whereby the residence time of the top coat powder in the plasma gas stream is increased.

15. The process of claim 8, wherein the step of translating a spray of softened top coating medium occurs at a rate of from two to ten inches per minute (2 to 10"/min).

16. The process of claim 6, wherein the step of passing the blades through the spray of particles of softened top coating includes heating the blade tips to a temperature, of from three hundred to eight hundred and fifty degrees Fahrenheit (300° to 850° F.).

17. A process for controllably applying thermal coating to the tips of gas turbine engine compressor blades having a tip, an airfoil and a root, the airfoil having a leading edge, a trailing edge, a suction surface and a pressure surface which extend between the edges, using relative motion between a holding fixture and a spray gun, wherein a splat structure having vertical microcracks results, comprising the steps of:

I. applying a bond coating to the blade tips including
   a) positioning blades circumferentially in a rotatable fixture, having exposed, clean tips, and the airfoil having a mask spaced from the airfoil leaving gaps therebetween, wherein the blades are oriented perpendicular to the axis of rotation of the fixture;
   b) propelling a spray of particles of softened bond coating medium which includes the steps of
      forming a spray of particles of softened bond coating medium, which includes the steps of
         positioning the spray gun at a distance of from four to six inches (4 to 6") away from the blade tips;
         powering spray gun to a range from thirty to fifty kilowatts (30 to 50 KW);
         generating a plasma gas stream by heating a primary gas with a gas flow rate of from seventy-five to one hundred and fifteen standard cubic feet per hour (75 to 115 scfh) and a secondary gas with a flow rate of from ten to twenty-five standard cubic feet per hour (10 to 25 scfh) and flowing bond coat powder at a feed rate of from thirty to fifty five grams per minute (30 to 55 gms/min) into the plasma gas stream;
         softening a bond coat powder in the plasma gas stream of the spray gun;
         directing the spray of softened bond coating which includes the step of
            translating the spray of softened bond coating by moving the spray gun in a direction substantially parallel to the axis of rotation of the fixture at a rate of from six to twelve inches per minute (6 to 12"/min);
   c) passing the blades through the spray of particles of softened bond coating by rotating the holding fixture about its axis of rotation at a speed of from twenty to seventy-five revolutions per minute (20 to 75 rpm) in substantially the same surface of rotation as blades would circumscribe in an operating engine which includes the steps of
      simultaneously heating the tips of the blades by passing the blades in front of the spray gun to a temperature of from two hundred to four hundred and fifty degrees Fahrenheit (200° to 450° F.) and
      spraying bond coating onto blade tips;
      cooling the blades by rotating the blades away from the spray gun and using a cooling jet;
   d) sealing the gaps between the mask and the airfoil portion of the blades with the deposition of the spray of particles of bond coating;

e) passing the blades continuously past the spray gun in a sequential fashion and f) depositing a plurality of layers of bond coating to the blade tips;

II. applying a top coating to the blade tips including a) propelling a spray of particles of softened top coating medium which includes the steps of
forming a spray of particles of softened top coating medium which includes the steps of
repositioning the spray gun to be at a distance of from three to four inches (3 to 4") from the blade tips;

powering spray gun to a range from 30 to 50 KW;

injecting top coat powder into the plasma of the spray gun which further includes the angling of the injection such that it imparts a component of velocity to the powder which is opposite to the direction of flow of the plasma gas stream toward the rotating fixture, the projection of the injection angle in a plane perpendicular to axis of rotation of the holding fixture lies in a range from sixty-five to eighty-five degrees (65° to 85°) wherein the residence time of the powder in the plasma gas stream is increased;

generating a plasma gas stream by heating a primary gas with a gas flow rate of from fifty to ninety standard cubic feet per hour (50 to 90 scfh) and a secondary gas having a flow rate of ten to thirty standard cubic feet per hour (10 to 30 scfh) and flowing top coat powder at a feed rate of from fifteen to forty grams per minute (15 to 40 gms/min) into the plasma gas stream;

softening top coating powder in the plasma gas stream of the spray gun;

directing the spray of softened top coating medium which includes the step of moving the spray gun in a direction substantially parallel to the plane of rotation of the fixture at a rate of from two to ten inches per minute (2 to 10"min);

b) passing the blades through the spray of particles of softened top coating by rotating the holding fixture at a speed of from twenty to seventy-five revolutions per minute (20 to 75 rpm) in substantially the same surface of rotation as blades would circumscribe in an operating engine, which includes the steps of
simultaneously heating the tips of blades to temperatures ranging from three hundred to eight hundred and fifty degrees Fahrenheit (300° to 850° F.) by passing in front of spray gun;

spraying top coating onto the blade tips;

cooling the blade tips by rotating the blades away from the spray gun;

c) sequentially depositing a plurality of layers of top coating to the blade tips;

III) removing said blades from the holding fixture wherein layers of bond and top coating are sequentially deposited such that adjacent points on the blade tips approximate a surface of rotation substantially parallel to the surface of rotation which the blade tip will experience in a working engine and any variations in the parameters of the coating process are spread out over a number of the blades disposed in the holding fixture to result in a uniform, stable coating in operative conditions.

18. The process of claim 17, wherein the top coating medium has an improved resistance to corrosion, and wherein the top coating medium consists of from eleven to fourteen weight percent (11 to 14 wt. %) yttria and the balance essentially zirconia.

* * * * *